United States Patent
Connor

(10) Patent No.: US 6,557,944 B1
(45) Date of Patent: May 6, 2003

(54) DUMP TRUCK APPARATUS WITH REMOVABLE HOPPER

(75) Inventor: William T. Connor, Parry Sound (CA)

(73) Assignee: Connor Industries, Parry Sound (CA)

( * ) Notice: Subject to any disclaimer, the term of this patent is extended or adjusted under 35 U.S.C. 154(b) by 0 days.

(21) Appl. No.: 09/984,838

(22) Filed: Oct. 31, 2001

(51) Int. Cl.$^7$ .................................................. B60P 1/36
(52) U.S. Cl. ........................... 298/24; 298/27; 239/657; 239/672; 414/498; 414/528
(58) Field of Search ................................ 198/538, 547, 198/548, 550.2, 550.13; 239/650, 657, 670, 672; 296/184; 298/17 R, 22 R, 24, 25, 26, 27, 28; 414/498, 528

(56) References Cited

U.S. PATENT DOCUMENTS

| | | | | |
|---|---|---|---|---|
| 2,870,923 A | * | 1/1959 | Jewil, Jr. ..................... | 414/528 |
| 3,180,511 A | * | 4/1965 | Huisman ..................... | 414/498 |
| 3,559,894 A | * | 2/1971 | Murray et al. .............. | 239/672 |
| 3,693,890 A | * | 9/1972 | Torrey ........................ | 239/668 |
| 4,124,167 A | * | 11/1978 | Coleman .................... | 239/673 |
| 4,162,766 A | * | 7/1979 | Ten Broeck et al. ........ | 239/656 |
| 4,995,773 A | * | 2/1991 | Lamoureux et al. ........ | 414/489 |
| 5,466,112 A | * | 11/1995 | Feller ......................... | 414/528 |
| 5,772,389 A |   | 6/1998 | Feller ......................... | 414/489 |
| 6,089,478 A | * | 7/2000 | Truan et al. ................ | 239/675 |
| 6,092,966 A | * | 7/2000 | Martin et al. .............. | 298/22 P |

OTHER PUBLICATIONS

E–Z Dumper—The Original E–Z Dumper, Published at least as early as May 31, 2001, p. 1–2.

* cited by examiner

Primary Examiner—D. Glenn Dayoan
Assistant Examiner—Paul Chenevert

(57) ABSTRACT

An apparatus capable of adapting a vehicle for use in either of a dump truck mode or a spreader truck mode includes a dump body unit and a removable hopper. The dump body unit has a main frame pivotally interconnected with a dump body. The main frame attaches to the vehicle and supports the dump body. The dump body has a substantially flat bed with a lengthwise channel containing an embedded conveyor. In dump truck mode, the conveyor is covered and materials may be loaded into and dumped from the dump body. In spreader truck mode, the conveyor is uncovered and the hopper is attached to the dump body so that an aperture at the hopper's base is aligned over the conveyor. Gravity-fed materials may then be conveyed along the body to an attached spreader for dispersion.

19 Claims, 8 Drawing Sheets

DUMP TRUCK APPARATUS WITH REMOVABLE HOPPER

FIELD OF THE INVENTION

The present invention relates to the field of dump trucks, and more particularly to dump trucks capable of being used as spreader trucks.

BACKGROUND OF THE INVENTION

Large scale civil projects such as road construction, road repairs, or snow removal normally require the use of certain types of heavy equipment, and in particular, certain types of vehicles, for their successful completion. Different types of vehicles may be used for different purposes.

For example, one type of vehicle commonly utilized during municipal or construction projects is the dump truck. As known by those skilled in the art, dump trucks have a dump body that is capable of being pivoted upwardly about a rear axis transverse to the length of the truck for rapid unloading of materials contained therein. Dump trucks are useful for hauling heavy loads comprising various types of materials, such as earth or crushed stone, and easily depositing them in a desired location.

Another type of vehicle that can be very useful is the spreader truck. Spreader trucks are vehicles that are capable of hauling dispersible materials, such as sand or salt, and spreading these materials over the underlying ground surface (usually when the vehicle is in motion). Spreader trucks typically have a body consisting of a generally V-shaped hopper with a conveyor at the bottom for feeding material back towards the rear of the truck. The "V" shape of the body promotes effective gravity feeding of contained materials into the conveyor. In typical operation, the conveyor is engaged to convey the materials rearwardly onto one or more "spreaders" (e.g. spinning plates with radial upstanding ribs) for dispersion over an expanse of underlying road. Spreader trucks of this type are commonly used in colder climates to disperse granular salt onto ice-covered roadways.

Unfortunately, vehicles such as dump trucks and spreader trucks can be expensive. As a result, it can be difficult for some entities, such as municipalities or enterprises with limited budgets, to be able to afford all of the various types of vehicles that they may require.

Recognizing this problem, at least one manufacturer has thought to produce a vehicle that is capable of being used in multiple capacities. The rationale of this approach is that, because the bulk of the expense of a heavy vehicle may be attributable to its understructure (i.e. chassis, wheels, engine, drive train, cab, etc.) as opposed to its accessories (e.g. hopper, spreader, or dumping actuator), it is more economical to provide a single vehicle understructure that can be configured for use in various capacities.

A known apparatus following this approach is the combined dump truck and spreader apparatus described in U.S. Pat. No. 5,772,389. The dump truck of this patent has a dump body with a generally semi-circular cross-section and an integral conveyor attached at its base that is capable of conveying materials back towards the rear of the truck. A latchable tailgate is pivotally secured to the rear of the body. A hoist mechanism at the front of the dump body is capable of inclining the body with the attached conveyor for rapid unloading of materials, in the manner of a conventional dump truck. When used as a dump truck, a cover is placed over the conveyor mechanism at the base of the dump body to prevent any material from flowing thereinto, and the conveyor is left inactivated. Material may thus be loaded into the body, transported, and dumped in a conventional manner, with the dumped material exiting the inclined body through the unlatched tailgate. When used as a spreader, the rear tailgate is kept closed, the conveyor mechanism is left uncovered, and the dump body is kept in a lowered position. Material contained in the semi-circular body is fed by gravity into the conveyor, which may be engaged to convey the material rearwardly onto a conventional spreader at the rear of the truck.

A disadvantage of the above apparatus is the fact that the bed of the dump body is semi-circular and not flat. Dump trucks having a flat bed are particularly versatile, in that they may alternatively be used to carry items which are best kept upright or on a flat surface during transportation. Such items may include road construction barriers (e.g. stacked pylons or cones) or stacks of plywood for example. The above described device is not suitable for transporting such items.

A further possible disadvantage of the above apparatus is the fact that it incorporates a truck chassis. A municipality or enterprise with limited means may not be able to afford the purchase of a chassis, which is typically only sold as a component of a costly, complete vehicle. Such entities may instead wish to purchase a less expensive apparatus that can be fitted onto an existing vehicle, such as a large pickup truck, to convert it to a multi-purpose vehicle.

Apparatus for attachment to an existing vehicle are in fact commercially available. For example, one apparatus marketed under the name "EZ Dumper" is a hydraulically-operated dump unit designed to be installed in the bed of a pickup truck for conversion of the pickup truck into a dump truck. The apparatus includes a dump body and an attached hydraulic hoist mechanism that is capable of inclining the body in the manner of a conventional dump truck for rapid unloading of materials. The EZ Dumper apparatus may also be fitted with an attachment for further conversion of the vehicle into a spreader truck. This attachment comprises a hopper with an integrated conveyor at its base, which is attached to the dump body. Moreover, a spreader is attached at the rear of the dump body near the end of the conveyor. Materials loaded into the hopper are fed by gravity onto the conveyor, which may be engaged to convey the material rearwardly onto the spreader for dispersion.

Disadvantageously, conversion of a truck utilizing the EZ Dumper apparatus from its dump truck capacity to its spreader truck capacity can be difficult. Conversion involves attachment of the hopper with its integral conveyor to the dump body. Because the conveyor mechanism can add significant weight to the hopper, a hoist or similar system for lifting heavy objects may need to be used to move the hopper/conveyor during conversion. Alternatively, it may be necessary for a team of persons to work in unison to lift the hopper off of or onto the dump body. Furthermore, in order for the conveyor portion of a newly-attached hopper to receive power for operation, electrical wires or hydraulic lines must be connected thereto. This requirement of attaching (or detaching) wires or hydraulic lines not only complicates the conversion process, but may impede proper operation of the conveyor if a connection is improperly made.

What is therefore needed is a multi-purpose vehicle, usable as a flat bed dump truck or a spreader truck, which can be converted between these alternative uses with a minimum of effort and without any requirement of attaching electrical wires or hydraulic lines. What is also needed is an apparatus with which existing vehicles such as pickup trucks can be outfitted for transformation into a multi-purpose vehicle like the one just described.

SUMMARY OF THE INVENTION

The present invention is directed to an apparatus which addresses at least some of the shortcomings described above. The apparatus is capable of adapting a vehicle for use in either of a dump truck mode or a spreader truck mode.

The apparatus includes a dump body unit and a removable hopper. The dump body unit comprises a main frame that is pivotally interconnected with a dump body at a pivotal axis. The main frame attaches to the vehicle and supports the dump body. The dump body has a substantially flat bed with an attached conveyor. In dump truck mode, the conveyor may be covered and materials may be loaded into the dump body for hauling. A hoist is capable of selectively pivoting the dump body about the pivotal axis between a lowered "hauling" position and a raised "dumping" position for rapid unloading of materials. In spreader truck mode, the conveyor may be uncovered and the hopper is attached to the dump body so that an aperture at the hopper's base is aligned with the conveyor. Engagement of the conveyor causes materials fed by gravity from within the hopper to be conveyed along the dump body for dispersion, typically by an attached spreader which cooperates with the conveyor.

Optionally, the main frame may comprise a truck chassis. In this case attachment of the main frame to the vehicle is inherent the fact that the chassis forms part of a In accordance with an aspect of the present invention there is provided an apparatus for adapting a vehicle for use as a dump truck or a spreader truck, comprising: a main frame; a dump body pivotally interconnected to said main frame, said dump body including a conveyor extending substantially along the length of said dump body and being joined thereto, said dump body further including a bed which, other than at said conveyor, is substantially flat; a hoist for selectively pivoting said dump body; a removable hopper for passing materials onto said conveyor when installed in said dump body; and at least one interconnector for releasably connecting said hopper to said dump body.

In accordance with another aspect of the present invention there is provided a method of converting a vehicle adapted for use as a dump truck with an apparatus for adapting a vehicle for use as a dump truck or a spreader truck, said apparatus comprising: a main frame; a dump body pivotally interconnected to said main frame, said dump body having a conveyor joined thereto, said dump body further including a bed which, other than at said conveyor, is substantially flat, wherein said conveyor is situated below said bed and wherein said dump body comprises a channel opening onto said conveyor; a hoist for selectively pivoting said dump body; a removable hopper for passing materials onto said conveyor when installed in said dump body, said hopper comprising a downwardly directed lip for extending into said channel when said hopper is installed in said dump body; at least one interconnector for releasably connecting said hopper to said dump body; and a removable cover configured such that, when said hopper is removed, said cover may be installed within said channel so as to cover said conveyor and so as to have an upper surface flush with said bed of said dump body, for use as a spreader truck, said method comprising: removing said cover from the bed of said dump body; placing the lip of said hopper within said channel to locate said hopper within said dump body; and connecting said hopper to said dump body with said at least one interconnector.

In accordance with still another aspect of the present invention there is provided an apparatus for adapting a vehicle for use as a dump truck or a spreader truck, comprising: a truck chassis; a dump body pivotally interconnected to said truck chassis, said dump body including a conveyor extending substantially along the length of said dump body and being joined thereto, said dump body further including a bed which, other than at said conveyor, is substantially flat; a hoist for selectively pivoting said dump body; a removable hopper for passing materials onto said conveyor when installed in said dump body; and at least one interconnector for releasably connecting said hopper to said dump body.

In accordance with yet another aspect of the present invention there is provided an apparatus for adapting a vehicle for use as a dump truck or a spreader truck, comprising: a main frame; a dump body pivotally interconnected to said main frame, said dump body including a front wall, two side walls, a bed, an attached conveyor situated below said bed within a channel extending substantially along the length of said dump body, and an opening through which conveyed materials may pass for spreading, said bed of said dump body being substantially flat other than at said conveyor; a hoist for selectively pivoting said dump body; a removable hopper for passing materials onto said conveyor when installed in said dump body, said hopper including a downwardly directed lip for extending into said channel when said hopper is installed in said dump body; and at least one interconnector for releasably connecting said hopper to said dump body.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention.

DETAILED DESCRIPTION

Figure 1:
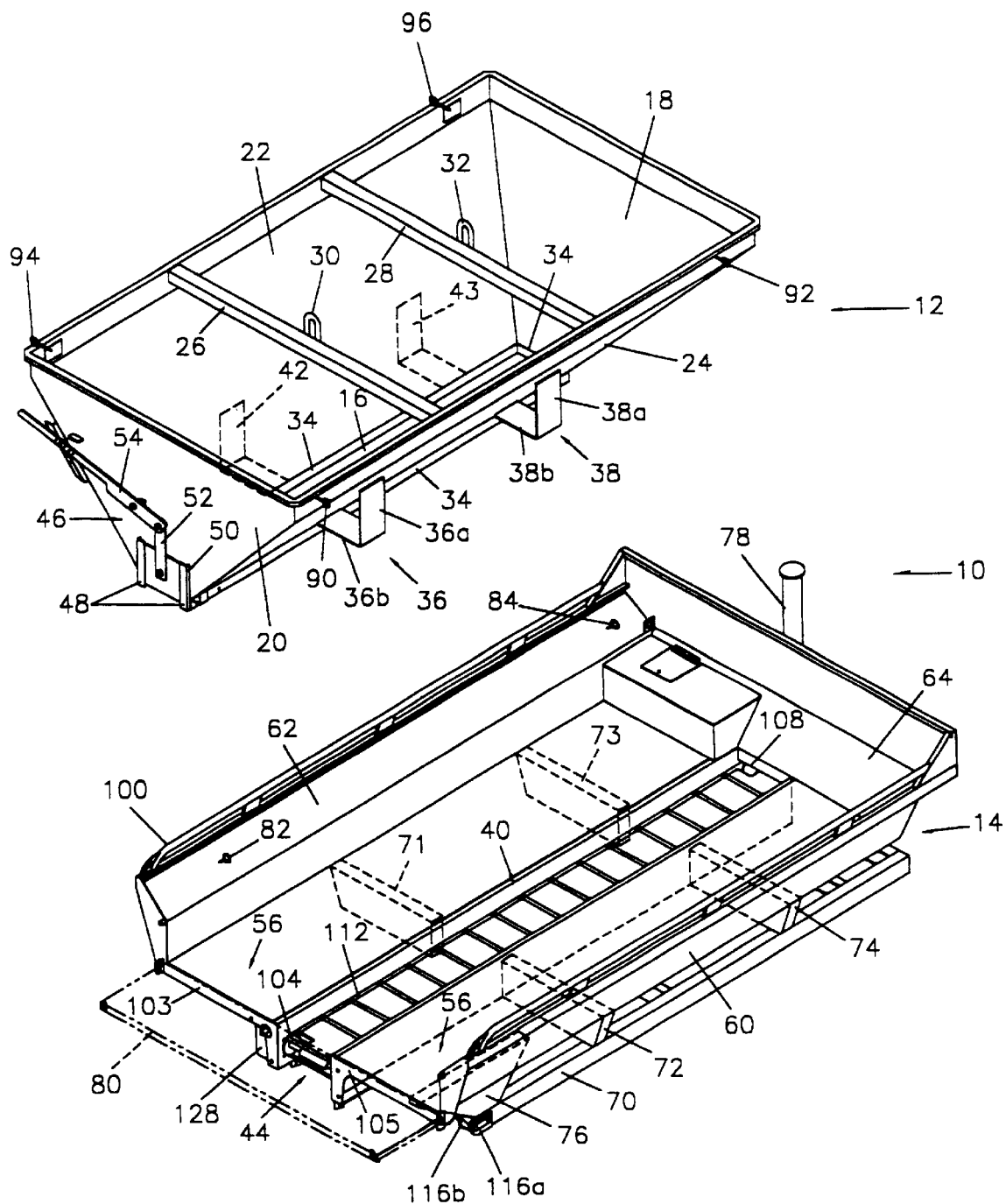
FIG. 1 illustrates a dump truck apparatus exemplary of the present invention in exploded rear perspective view.
Figure 2:
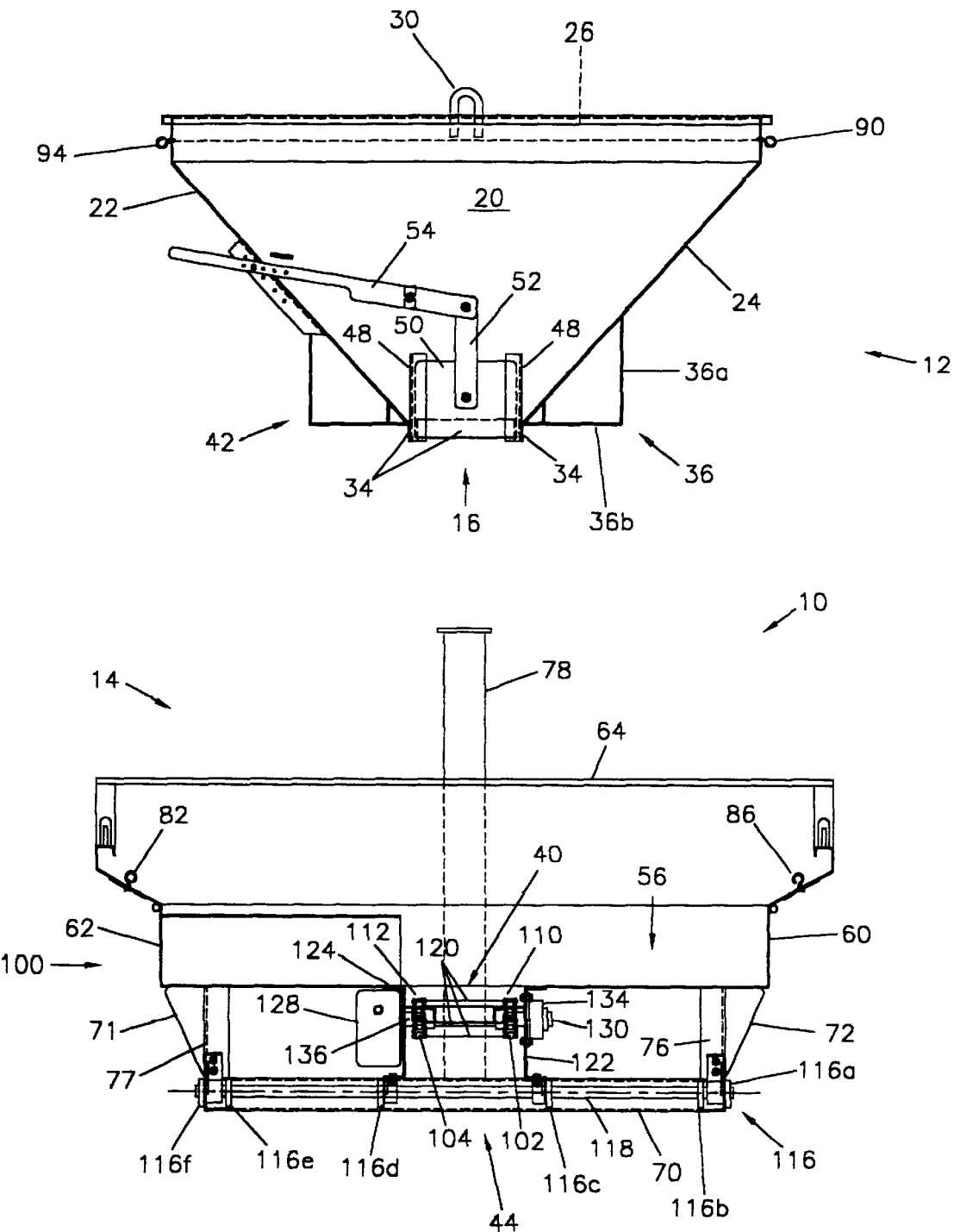
FIG. 2 is a rear view of the apparatus of FIG. 1.
Figure 3:
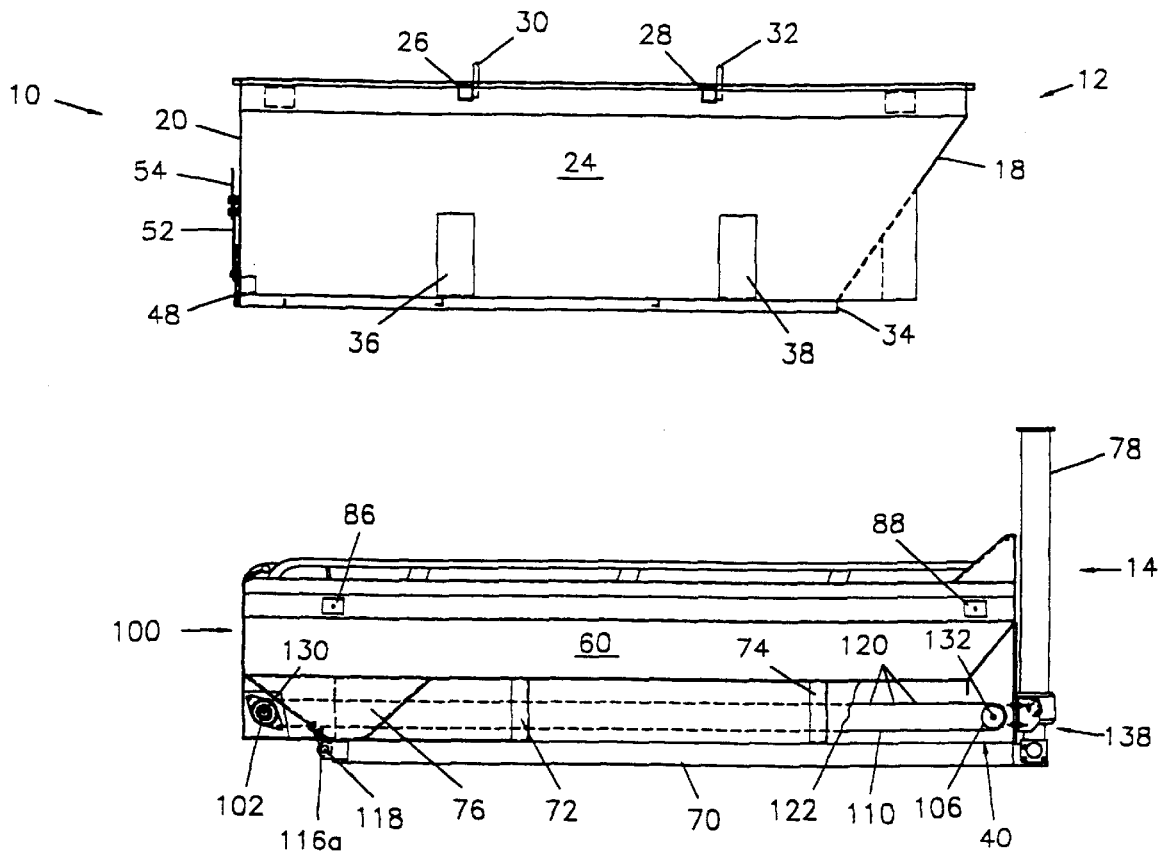
FIG. 3 is a side view of the apparatus of FIG. 1.

FIGS. 1, 2 and 3 illustrate an exemplary dump truck apparatus 10 for converting a vehicle such as a pickup truck into a dump truck or spreader truck. The apparatus 10 may also be installed directly on the long sills of a truck chassis. FIG. 1 is a rear perspective view of the apparatus 10, while FIGS. 2 and 3 provide rear and side views respectively. The apparatus 10 comprises two components, namely a dump body unit 14 and a removable hopper 12. The dump body unit 14 is intended to be installed in the bed of the vehicle for conversion of the vehicle into a dump truck. It will be appreciated that only the dump body unit 14 portion of the apparatus 10 is used when it is desired to configure the vehicle for use as a dump truck. The hopper 12 is attached to the installed dump body unit 14 only when it is desired to alternatively configure the vehicle for use as a spreader truck. The apparatus 10 thus has two modes of operation: dump truck mode (involving use of only the dump body unit 14) and spreader truck mode (involving use of both the dump body unit 14 and the hopper 12).

Dump body unit 14 consists of a dump body 100 pivotally interconnected with a main frame 70. The dump body 100 is for holding and dumping materials, while the main frame 70 attaches to a vehicle such as a pickup truck to install the apparatus. The main frame 70 also supports the dump body 100 when it is in a lowered or hauling position. Also included in dump body unit 14 is a hoist 138 (FIG. 3) for raising and lowering the dump body 100.

Dump body 100 includes a generally rectangular bed 56, side walls 60 and 62 and a front wall 64. A removable tailgate 80 (shown in ghost outline in FIG. 1) is optionally attached to the rear of the body 100, as will be described. The bed 56 is substantially flat and has a centrally disposed longitudinal channel 40. The channel 40 is rectangular and contains an embedded conveyor 44 for feeding material back towards the rear of the body. A pair of L-shaped reinforcing plates 103 and 105 at the rear of the dump body 100 (visible in FIG. 1 but omitted from FIG. 2 for clarity) help to attach the conveyor 44 to the bed 56.

The dump body 100 includes a pair of brackets 76 and 77 for pivotally interconnecting the dump body 100 with the main frame 70 which protrude downwardly from the underside of the bed 56 at its rear corners (FIG. 2). Each of the brackets 76 and 77 has a transverse circular aperture located distally from the bed 56. These apertures are coaxial and cooperatively hold a pivot pin 118 which is transverse to the dump body's length and capable of rotation within the apertures. The length of the pivot pin 118 is approximately the same as the width of the main frame 70. Four buttresses 71, 72, 73, and 74 protrude downwardly from the underside of bed 56 (FIG. 1). The orientation of the buttresses is transverse to the length of the dump body 100. Buttresses 71 and 72 are substantially coplanar and are closer the to rear of the body 100 than buttresses 73 and 74, which are also substantially coplanar. The four buttresses 71, 72, 73 and 74 serve to distribute the weight of the dump body 100 (and any contained materials) onto the main frame 70 when the body 100 is in a lowered position. As well, these buttresses provide structural integrity to the dump body 100 and help to secure the conveyor 44 to the body 100.

Dump body 100 includes a set of four screw eyes 82, 84, 86 and 88 (FIGS. 1–3) for attaching the hopper 12 to the dump body unit 14 when the apparatus 10 is used in its spreader truck mode. Screw eyes 82 and 84, which are best seen in FIG. 1, protrude upwardly and inwardly from the side wall 62 of the body 100 near its top edge with the first screw eye 82 being proximate to optional tailgate 80 and the second screw eye 84 being proximate to the front wall 64. The screw eyes 86 and 88 protrude inwardly from the opposite side wall 60 in a symmetric arrangement.

One edge of the optional tailgate 80 of the dump body 100 is pivotally attached to the rear edge of the bed 56 along an axis that is transverse to the length of the dump body 100. The tailgate 80 may be pivoted upwardly around this axis and latched in its raised position to form a substantially vertical rear wall of the dump body 100, during hauling of materials for example. The tailgate is capable of being removed from the dump body 100, during the dumping of materials for example. Tailgate 80 is omitted from FIGS. 2 and 3 for clarity.

Figure 4:
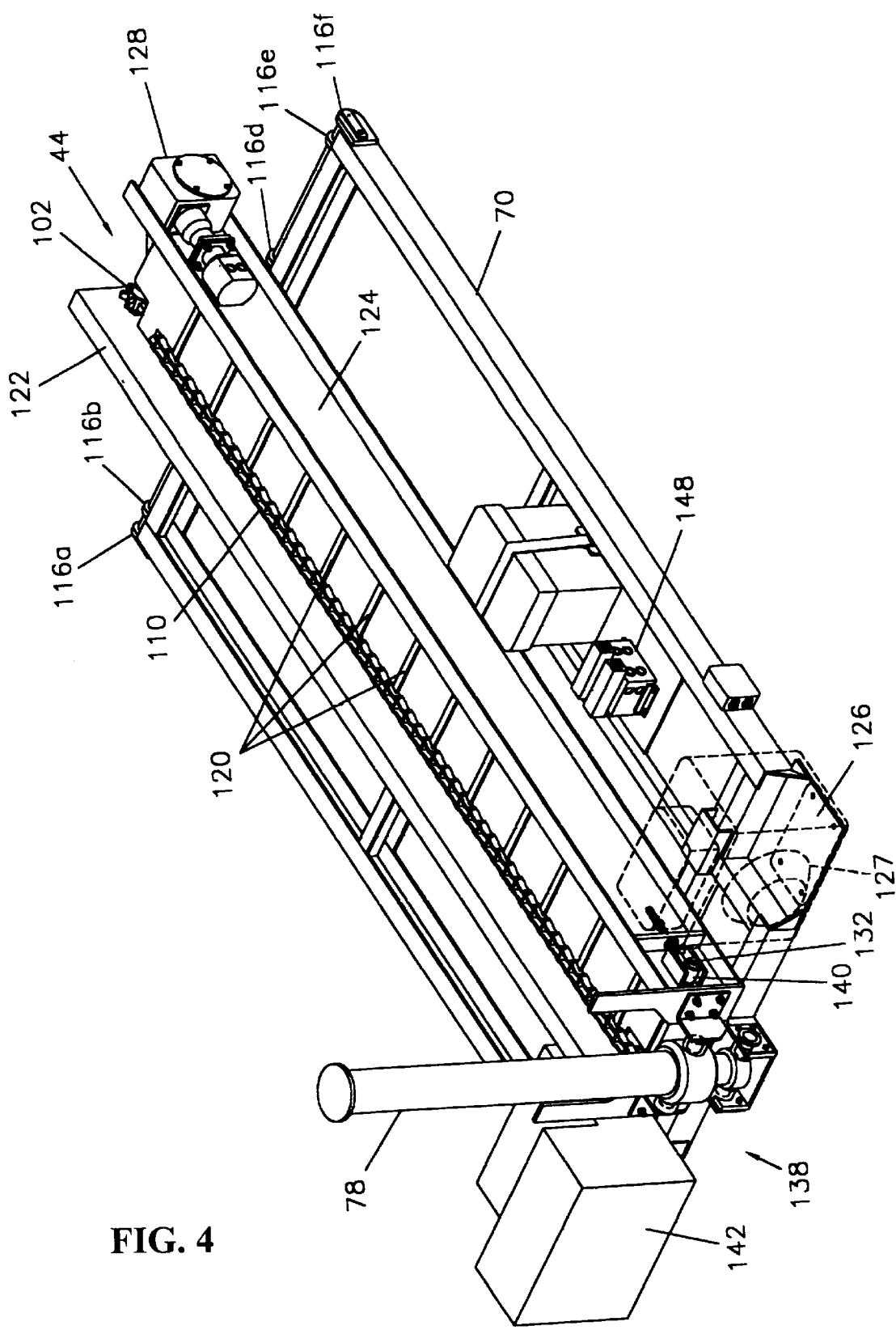
FIG. 4 illustrates in front perspective view a portion of the apparatus of FIG. 1.

As best seen in FIG. 4 (which illustrates in front perspective view the main frame 70, the conveyor 44 portion of the dump body 100, and the hoist 138), main frame 70 is a rectangular frame having an extent similar to that of the dump body bed 56. The rear section of the frame 70 has a set of six rearwardly protruding brackets 116a, 116b, 116c, 116d, 116e and 116f (FIG. 2). Each of the brackets 116 has a circular aperture transverse to the length of the frame 70. The apertures are coaxial and fixedly retain the pivot pin 118. Pivot pin 118 thus defines a pivotal axis about which the dump body 100 may rotate in relation to the main frame 70 during raising of the body 100 to its inclined "dumping" position or lowering of the body to its "hauling" position. A motor mounting plate 126 near the front of the frame 70 is suitable for mounting an optional small engine 127. This optional small engine may provide an alternative power source (instead of the vehicle's engine) for driving the hoist 138 and the conveyor 44, as will be described.

The hoist 138 is a conventional hydraulic hoist including a hydraulic cylinder 78 and a hydraulic tank 142. The hoist 138 is disposed at the front of the dump body unit 14 and is pivotally interconnected with the front of main frame 70 and the front of dump body 100. Extension of the cylinder 78 results in rotation of the dump body 100 about pivot pin 118 away from main frame 70 to incline body 100 to its raised or dumping position, while retraction of the cylinder 78 results in rotation of the dump body 100 about pin 118 towards frame 70 to decline the body to its lowered or hauling position. The hoist 138 may be powered by way of a Power Take-Off (PTO) of the vehicle, which, as known in the art, is an interface from a vehicle's engine to drive hydraulic systems. Alternatively, in the event that the vehicle is not equipped with a PTO feature, the hoist 138 may be powered by an optional small engine that may be mounted to mounting plate 126.

An integrated conveyor 44 is housed within the channel 40 in the bed 56 of the body 100. As may best be seen in FIGS. 1, 3 and 4, the conveyor mechanism 44 includes two conveyor side walls 122 and 124. Two longitudinally disposed and laterally spaced parallel endless chains 110 and 112 engage front and rear sprockets 108, 104 and 106, 102 respectively. A plurality of slats 120 for moving materials extends between the chains 110 and 112.

Rear sprockets 102 and 104 are coaxial and are fixedly mounted to a rear axle 130 that is transverse to the length of the conveyor 44. The ends of axle 130 are mounted by way of bearings 134 and 136 to conveyor side walls 122 and 124 respectively so as to facilitate rotation of the axle 130. A hydraulic motor 128 is mounted to the conveyor side wall 124, with its drive mechanism being connected to the axle 130 for driving the conveyor 44. Motor 128 is capable of further driving a spreader device that may be mounted near the rear of the conveyor 44 when the vehicle is used as a spreader truck, as will be described. The motor 128 may be powered by way of the Power Take-Off (PTO) of the vehicle or by the optional small engine that may be mounted to mounting plate 126.

Front sprockets 106 and 108 are also coaxial and are fixedly mounted to a front axle 132, which is similarly mounted in a transverse orientation between side walls 122 and 124 by way of bearings so as to permit rotation of the axle and sprockets. Only one of the bearings 140 is visible in FIG. 4.

The main frame may include an electrical-hydraulic interface 148 (FIG. 4) otherwise known as a control junction box. As known by those skilled in the art, the interface 148 is capable of receiving signals from electrical controls and adjusting hydraulic control valves in response thereto to provide electrical control of hydraulically powered devices such as the hoist 138 and conveyor 144. The electrical controls are typically located in the vehicle's cab for convenience and are interconnected by electrical wires to interface 148. Hydraulic lines interconnect the interface 148 with the hoist 138 and the motor 128 which drives the conveyor 44.

Hopper 12 (FIGS. 1–3) is generally V-shaped in cross-section and has a front and rear wall 18 and 20, respectively, as well as first and second side walls 22 and 24. The front wall 18 of the hopper 12 is sloped, with its bottom edge being more proximate to the opposing rear wall 20 than its top edge (as best seen in FIG. 3). Rear wall 20 is substantially vertical. The hopper 12 has a longitudinal rectangular aperture 16 at its base. A downwardly-protruding lip 34 extends from the bottom edge of the side walls 22 and 24 and from the base of the front wall 18 around three sides of the aperture 16. The outer perimeter of the lip 34 is suitably sized for being received by the channel 40 in dump body 100 in a secure fit when the hopper 12 is attached to the dump body 100 for use of the apparatus 10 in the spreader truck mode.

A pair of spars 26 and 28 extends between the interior top edges of side walls 22 and 24 to provide structural integrity to the hopper 12. The spars 26 and 28 are also for supporting a cover (not shown) that may optionally be laid over the top of hopper 12. Affixed to each spar 26 and 28 is a loop 30 and 32 which may be used for attaching hooks to lift the hopper 12 during conversion to or from spreader truck mode, or for suspended storage of the hopper 12.

As can best be seen in FIGS. 1 and 3, two longitudinally spaced right-angle brackets 36 and 38 are attached to the side wall 24 of the hopper 12 to provide a supporting base for the hopper when it is in place within the dump body unit 14. The angle brackets 36 and 38 also provide structural support to the side wall 24. The lower end of each angle bracket is attached at the base of the wall 24, while the upper end of each bracket is attached to the side wall 24 at a point that is apprpximately half the distance between the wall's top and bottom edges. The angle brackets are oriented so that their lower members 36b and 38b are substantially horizontal, to promote uniform contact between the underside of the members 36b and 38b and the flat dump body bed 56 when the hopper portion 12 is in place within dump body 100 during use of the apparatus 10 in its spreader truck mode. The upper members 36a and 38a of the angle brackets may be vertical. A second pair of right-angle brackets 42 and 43 is attached to the opposing side wall 22 in a symmetric arrangement.

A conventional levered door mechanism 46 (FIGS. 1–3) for controlling the release of material from the hopper 12 is attached to the exterior side of the hopper's rear wall 20. The door mechanism 46 includes a door plate 50 slidably received between a pair of vertical guide rails 48 attached to the base of the rear wall 20. The plate 50 is pivotally attached to one end of a first link arm 52. The other end of arm 52 is pivotally interconnected to an end of a second link arm 54. Link arm 54 is pivotally connected between its two ends to the rear wall 20 of the hopper 12. Downward pressure on the free end of link arm 54 results in the door plate 50 being raised.

A pair of screw eyes 90 and 92 (FIG. 1) for attaching the hopper 12 to the dump body unit 14 protrude outwardly from the side wall 24 of the hopper 12 near its top edge, with the first screw eye 90 being proximate to the rear wall 20 and the second screw eye 92 being proximate to the front wall 18. A second pair of screw eyes 94 and 96 protrudes outwardly from the opposite side wall 22 in a symmetric arrangement.

Figure 7:
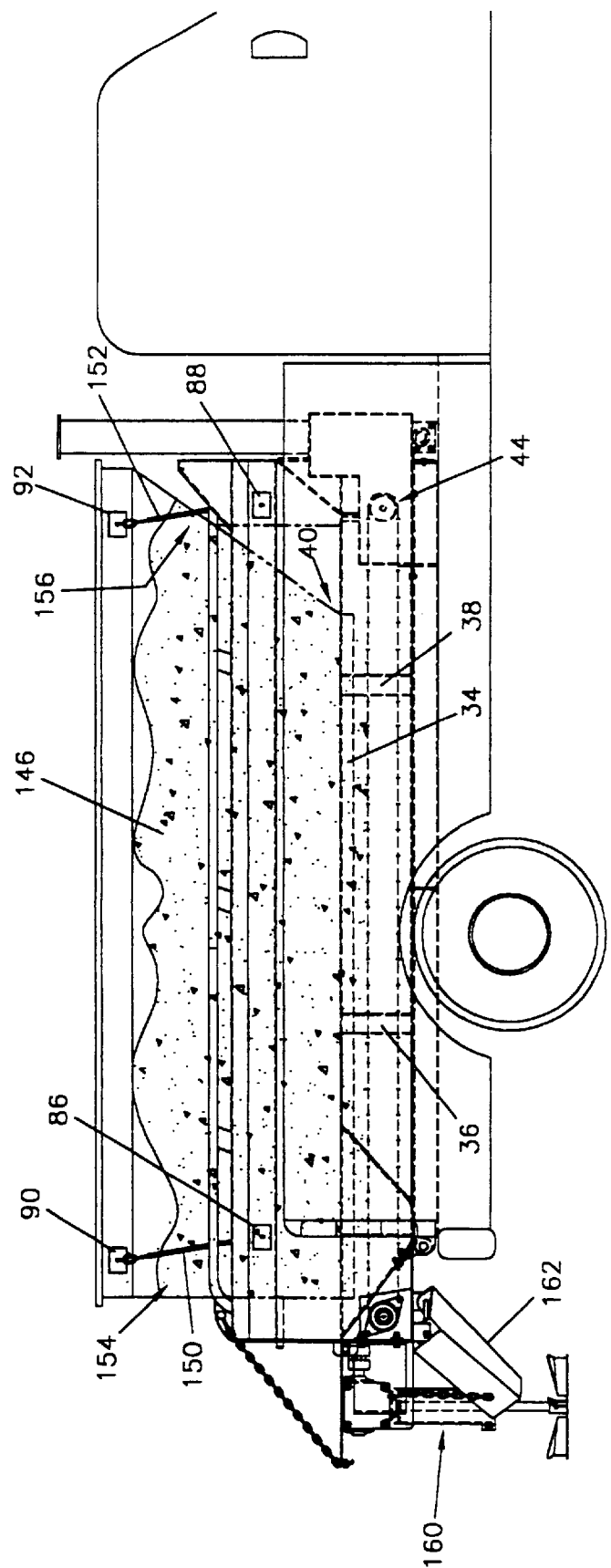
FIG. 7 is a side view of the apparatus of FIG. 1 installed in a pickup truck for use in a spreader truck mode.
Figure 8:
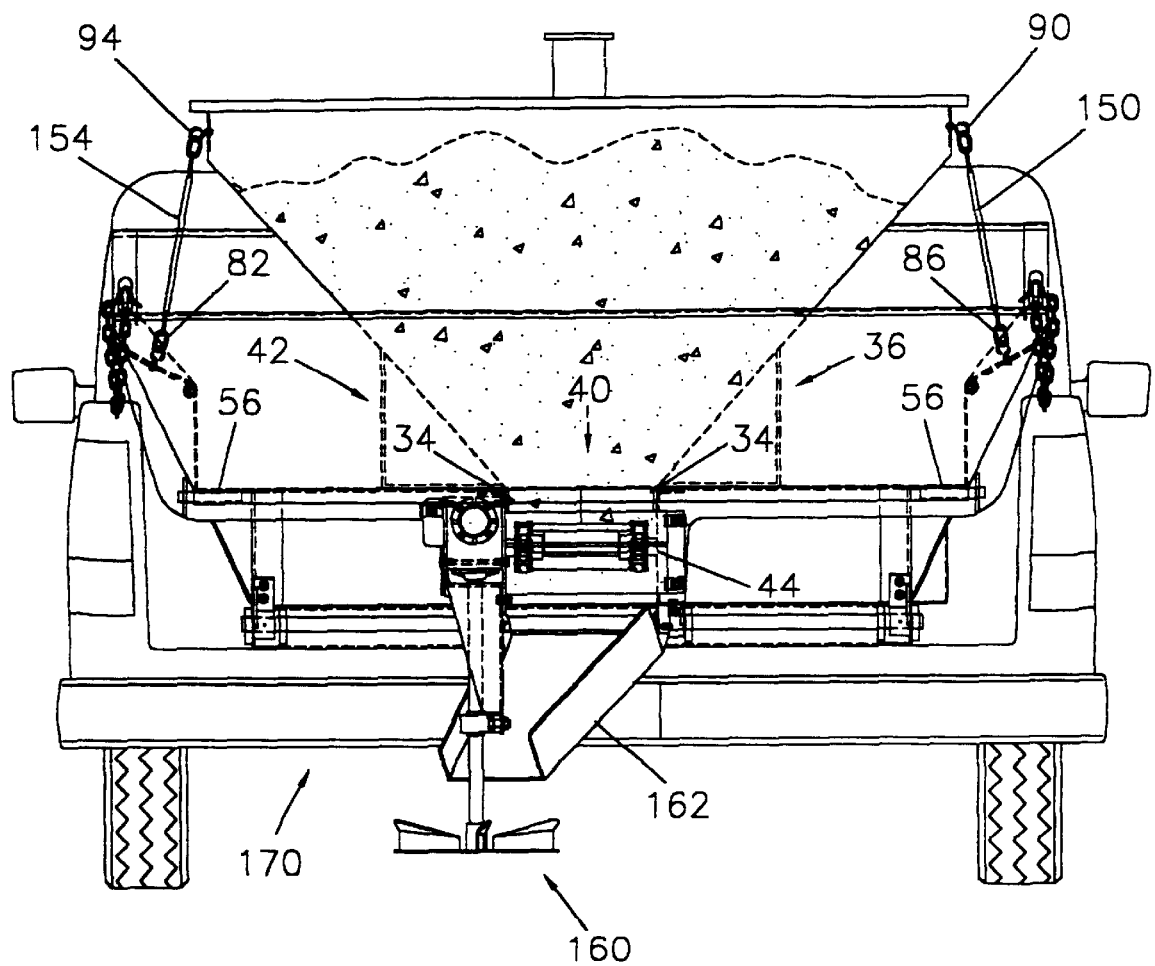
FIG. 8 is a rear view of the installed apparatus of FIG. 7.

The operation of the apparatus 10 occurs in one of two modes: dump truck mode and spreader truck mode. Use of the apparatus 10 in dump truck mode is illustrated in FIGS. 5 and 6, while use of the apparatus in spreader truck mode is illustrated in FIGS. 7 and 8.

Figure 5:
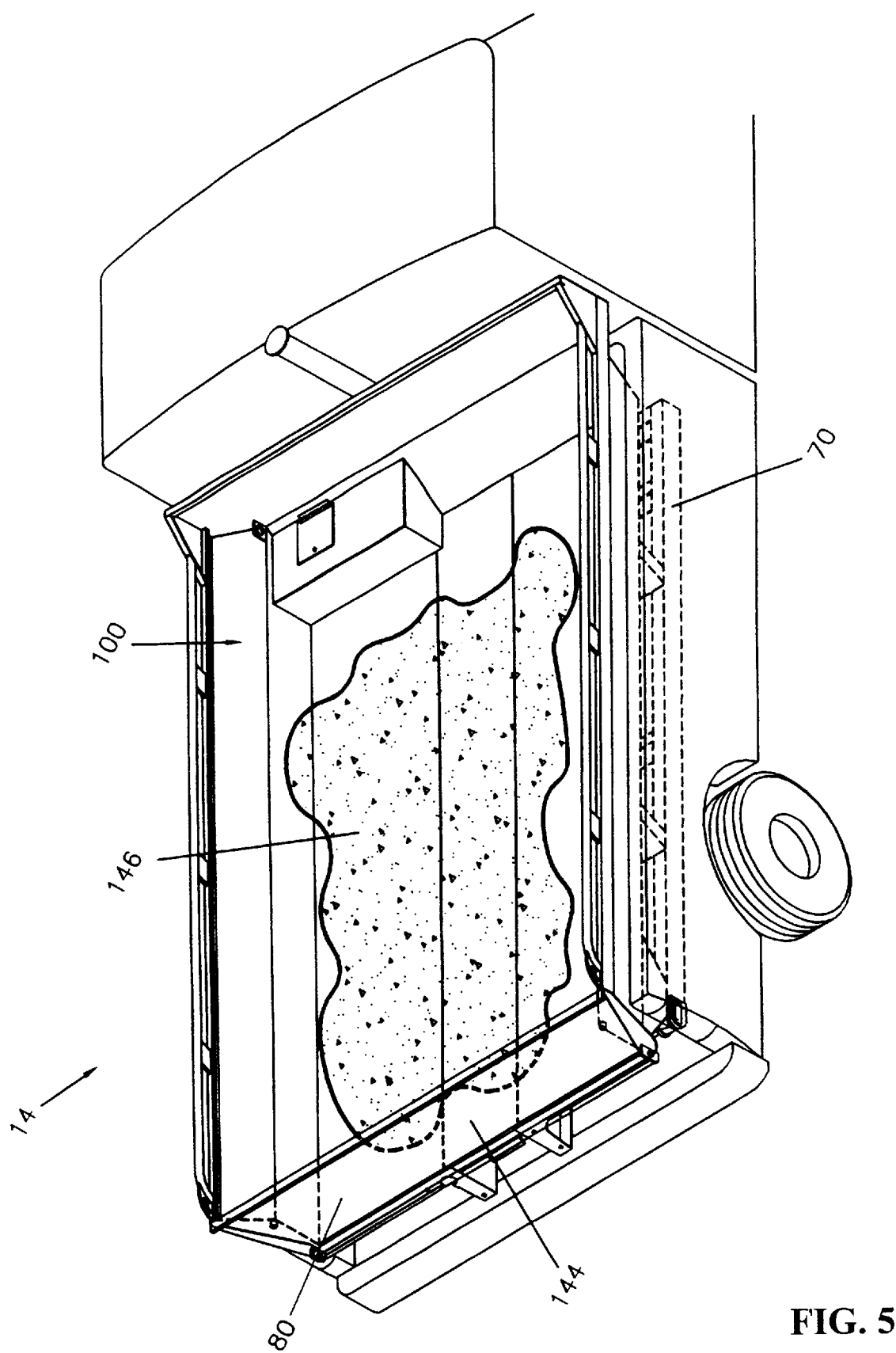
FIG. 5 is a rear perspective view of the dump body unit of the apparatus of FIG. 1 installed in a pickup truck for use in a dump truck mode.
Figure 6:
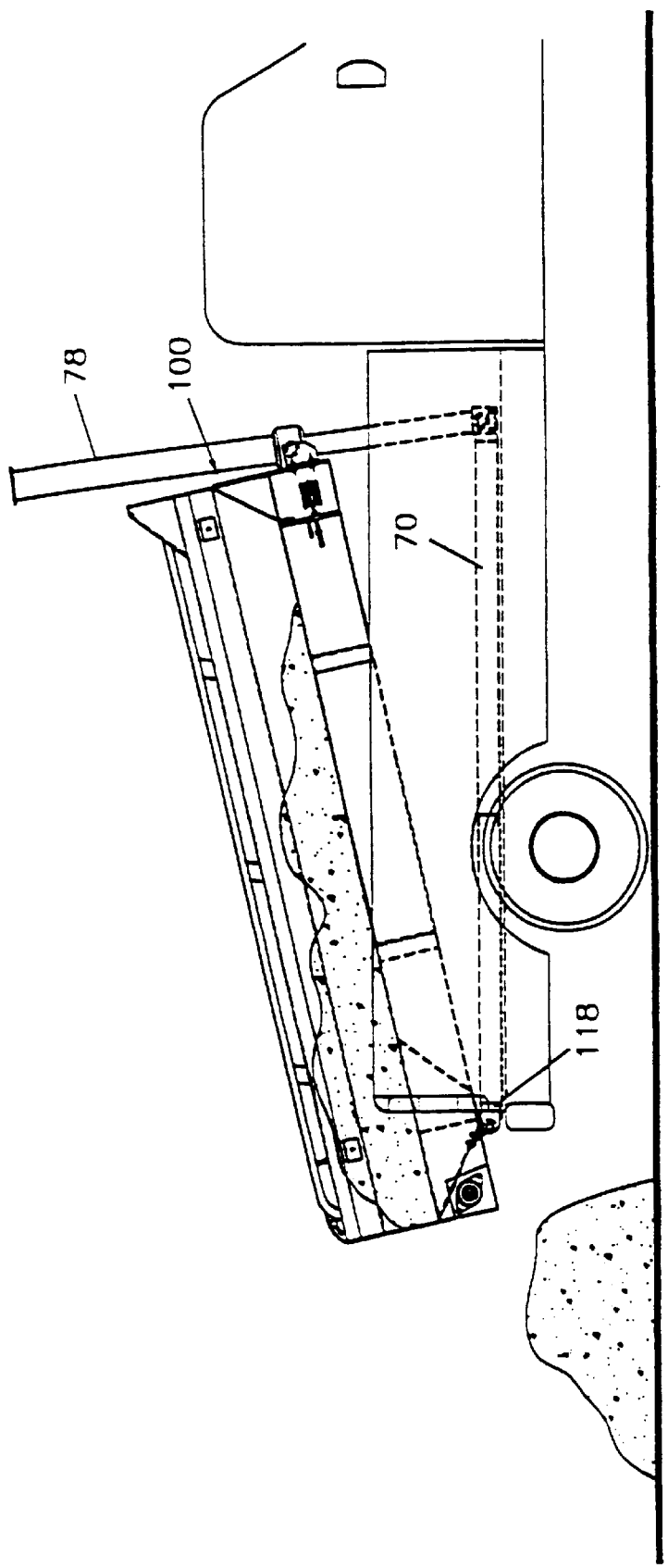
FIG. 6 is a side view of the installed dump body unit of FIG. 5 with the dump body in a raised position for dumping.

Referring first to FIGS. 5 and 6, the figures illustrate the dump body unit 14 installed in the bed of a pickup truck. Installation may be achieved by bolting the main frame 70 of the dump body unit 14 to the truck body or chassis. The vehicle's PTO is hydraulically interconnected with the electrical-hydraulic interface 148. Alternatively, if the vehicle lacks a PTO, a small engine that is attached to mounting plate 126 is hydraulically interconnected with the interface 148. Electrical controls in the cab of the vehicle for controlling the hoist and conveyor of apparatus 10 are interconnected with electrical-hydraulic interface 148 by way of electrical wires. It is noted that attachment of the dump body unit 14 to the pickup truck, including the requisite attachment of hydraulic lines and electrical wires, is done only upon this initial installation of the apparatus 10. The pickup truck's standard tailgate (if any) may be removed prior to installation.

Prior to any loading of materials into the dump body 100, a removable conveyor cover 144 (FIG. 5) is attached over the top of the channel 40 in dump body bed 56 so as to prevent any material from entering the conveyor mechanism 44. The cover 144 is attached by way of screws or similar removable fasteners. Alternatively, the cover may be slidably received in opposing grooves (not shown) which run the length of the interior of conveyor walls 122 and 124.

With the dump body 100 in its lowered or hauling position, the body 100 is filled with material 146 to be transported. The tailgate 80 may then be raised and latched to contain the material 146 during transportation. Hauling of the material 146 may then occur. When it is desired to unload the material 146, the tailgate 80 is first either lowered or removed. Next, the PTO is engaged or the small engine started and the electrical controls in the cab are used to activate the hoist 138. Engagement of the hoist 138 causes the cylinder 78 to extend, which in turn causes the dump body 100 to rotate about pivot pin 118 away from the main frame 70 until the dump body 100 is raised to its dumping position (FIG. 6), and the material 146 may thus be rapidly unloaded with the assistance of gravity.

Use of the apparatus 10 in its spreader truck mode is illustrated in FIGS. 7 and 8. In this mode, the dump body unit 14 remains installed in the pickup truck bed as it was in the dump truck mode. Any residual material 146 is removed from the body 100. The cover 144 is removed from the channel 40 to expose the conveyor 44. Next, the hopper 12 is lowered into the dump body 100 so that the downwardly protruding lip 34 of the hopper 12 is received in the channel 40. This serves to mate the hopper 12 with the body 100 and positions the aperture 16 directly over the conveyor 44. Contact between the lip 34 and the walls of the channel 40 also reduces the likelihood of lateral or forward shifting of the hopper 12 during use. The weight of the lowered hopper 12 is supported primarily by the underside of angle brackets 36, 38, 42 and 43, which contact the surface of the dump body bed 56. It will be appreciated that, since the hopper 12 does not include an integral conveyor, the weight of the hopper 12 may be sufficiently small that a single person may be capable of lowering the hopper 12 into the dump body 100 as described.

The lowered hopper 12 is then anchored to the dump body 100 through connection of the outwardly protruding screw eyes 90, 92, 94 and 96 of hopper 12 to the inwardly protruding screw eyes 86, 88, 82 and 84 (respectively) of the dump body 100. This interconnection is by way of turnbuckles 150, 152, 154 and 156 respectively, which are tightened to secure the hopper 12 to the dump body 100.

A conventional spreader unit 160 is attached near the rear of the conveyor 44. The spreader unit 160 may include a chute 162 that is attached below the end of the conveyor 44 in order to funnel materials 146 exiting from the conveyor 44 onto the spreader 160. The spreader 160 is interconnected with the drive mechanism of the hydraulic motor 128 so that motor 128, which drives the conveyor, can additionally drive the spreader 160.

With the dump body 100 being maintained in its lowered position during use of the apparatus in its spreader truck mode, the hopper 12 is filled with material 146 to be dispersed. The position of door 50 of hopper door mechanism 46 (FIGS. 1–3) may be adjusted through manipulation of the free end of link arm 54 so that a desired rate of release of the material 146 is achieved. To spread materials, the motor 128 is engaged using the electrical controls in the cab of the vehicle, so that both the conveyor 44 and the spreader unit 160 are activated. As a result, material 146 contained in the hopper 12, which is fed by gravity onto the moving conveyor 44, is conveyed rearwardly onto the spreader 160 for dispersion.

It will be appreciated that, conveniently, conversion of the apparatus from its dump truck mode to its spreader truck mode does not require the attachment of electric wires or hydraulic lines.

Conversion of the apparatus 10 back to its dump truck mode entails removal of the hopper 12 from the dump body unit 14 (with the associated detachment of turnbuckles 150, 152, 154 and 156), detachment of the spreader unit 160, and the covering of conveyor 44 with cover 144. Again, no interconnection of electric wires or hydraulic lines is required.

As will be appreciated by those skilled in the art, modifications to the above-described embodiment can be made without departing from the essence of the invention. For example, use of the apparatus 10 in its spreader truck mode does not necessarily require the attachment of a spreader 160. Absent a spreader, materials exiting the conveyor 44 may effectively be spread over the ground surface underlying the vehicle through scattering which results from the impact of the materials falling to the ground. When a spreader is in fact utilized, the spreader may be powered by a motor that is different from the motor which drives the conveyor unit.

The hopper 12 does not necessarily need to have a door mechanism 46 for controlling the rate of release of contained materials, but may instead have an aperture for a fixed rate of release. Also, front wall 18 does not necessarily need to be sloped.

The main frame 70 is attached to a truck chassis. In this case, attachment of the main frame 70 to the vehicle is inherent in the fact that the chassis forms part of a truck.

While not preferred, channel 40 could be omitted in which case the conveyor 44 would be mounted onto the bed 56 of dump body 100 rather than within channel 40. In such instance, cover 144 would extend upwardly into the dump body 100 to cover the conveyor 44 when the apparatus is used as a dump truck. The brackets of the hopper 12 would also need to be reconfigured to position the lip 34 of the hopper 12 around the conveyor.

Also, it is not necessary for the conveyor to be covered during use of the vehicle as a dump truck. Use of a conveyor cover may be deemed unnecessary during hauling of some rigid types of materials (e.g. sheets of plywood) because the materials may be too large to fall into the conveyor. Alternatively, in the case of granular or loose materials, the amount of material that may fall into the conveyor may be deemed negligible with respect to the size of the overall load, thus the added step of covering the conveyor may not be justified.

Other modifications will be apparent to those skilled in the art and, therefore, the invention is defined in the claims.

What is claimed is:

1. An apparatus for adapting a vehicle for use as a dump truck or a spreader truck, comprising:
   (a) a main frame;
   (b) a dump body pivotally interconnected to said main frame, said dump body including a conveyor extending substantially along the length of said dump body and being joined thereto, said dump body further including a bed which, other than at said conveyor, is substantially flat;
   (c) a hoist for selectively pivoting said dump body;
   (d) a removable hopper for passing materials onto said conveyor when installed in said dump body; and
   (e) at least one interconnector for releasably connecting said hopper to said dump body.

2. The apparatus of claim 1 wherein said conveyor is situated below said bed and wherein said dump body comprises a channel opening onto said conveyor.

3. The apparatus of claim 2 further comprising a removable cover configured such that, when said hopper is removed, said cover may be installed within said channel so as to cover said conveyor and so as to have an upper surface flush with said bed of said dump body.

4. The apparatus of claim 3 wherein said dump body comprises a plurality of receptors and said hopper comprises a like plurality of receptors and wherein said at least one interconnector comprises an interconnector between a receptor of said dump body and a receptor of said hopper.

5. The apparatus of claim 4 wherein each said receptor comprises a screw eye.

6. The apparatus of claim 5 wherein said interconnector comprises a turnbuckle.

7. The apparatus of claim 2 wherein said hopper comprises a downwardly directed lip for extending into said channel when said hopper is installed in said dump body.

8. The apparatus of claim 7 wherein said lip is sized so as to align said hopper within said dump body when said lip extends into said channel.

9. The apparatus of claim 1, wherein said hoist and said conveyor are powered by way of a power take off of the vehicle.

10. The apparatus of claim 1, further comprising an engine attached to said main frame for powering said hoist and conveyor.

11. The apparatus of claim 1, wherein said hopper further comprises a set of at least two braces mounted to the exterior of said hopper on opposite sides thereof for providing structural support thereto.

12. The apparatus of claim 11, wherein said set of braces supports at least part of the weight of said hopper when the hopper is within said dump body during use of the vehicle as a spreader truck.

13. The apparatus of claim 11, wherein said braces comprise angle brackets.

14. The apparatus of claim 1, further comprising a spreader cooperating with said conveyor for dispersing materials.

15. A method of converting a vehicle adapted for use as a dump truck with an apparatus for adapting a vehicle for use as a dump truck or a spreader truck, said apparatus comprising: a main frame; a dump body pivotally interconnected to said main frame, said dump body having a conveyor joined thereto, said dump body further including a bed which, other than at said conveyor, is substantially flat, wherein said conveyor is situated below said bed and wherein said dump body comprises a channel opening onto said conveyor; a hoist for selectively pivoting said dump body; a removable hopper for passing materials onto said conveyor when installed in said dump body, said hopper comprising a downwardly directed lip for extending into said channel when said hopper is installed in said dump body; at least one interconnector for releasably connecting said hopper to said dump body; and a removable cover configured such that, when said hopper is removed, said cover may be installed within said channel so as to cover said conveyor and so as to have an upper surface flush with said bed of said dump body, for use as a spreader truck, said method comprising:
(a) removing said cover from the bed of said dump body;
(b) placing the lip of said hopper within said channel to locate said hopper within said dump body; and
(c) connecting said hopper to said dump body with said at least one interconnector.

16. An apparatus for adapting a vehicle for use as a dump truck or a spreader truck, comprising:
(a) a truck chassis;
(b) a dump body pivotally interconnected to said truck chassis, said dump body including a conveyor extending substantially along the length of said dump body and being joined thereto, said dump body further including a bed which, other than at said conveyor, is substantially flat;
(c) a hoist for selectively pivoting said dump body;
(d) a removable hopper for passing materials onto said conveyor when installed in said dump body; and
(e) at least one interconnector for releasably connecting said hopper to said dump body.

17. An apparatus for adapting a vehicle for use as a dump truck or a spreader truck, comprising:
(a) a main frame;
(b) a dump body pivotally interconnected to said main frame, said dump body including a front wall, two side walls, a bed, an attached conveyor situated below said bed within a channel extending substantially along the length of said dump body, and an opening through which conveyed materials may pass for spreading, said bed of said dump body being substantially flat other than at said conveyor;
(c) a hoist for selectively pivoting said dump body;
(d) a removable hopper for passing materials onto said conveyor when installed in said dump body, said hopper including a downwardly directed lip for extending into said channel when said hopper is installed in said dump body; and
(e) at least one interconnector for releasably connecting said hopper to said dump body.

18. The apparatus of claim 17 further comprising a removable cover configured such that, when said hopper is removed, said cover may be installed within said channel so as to cover said conveyor and so as to have an upper surface flush with said bed of said dump body.

19. The apparatus of claim 17, further comprising a spreader cooperating with said conveyor for dispersing materials.

* * * * *

UNITED STATES PATENT AND TRADEMARK OFFICE
CERTIFICATE OF CORRECTION

PATENT NO. : 6,557,944 B1 Page 1 of 1
DATED : May 6, 2003
INVENTOR(S) : William T. Connor It is certified that error appears in the above-identified patent and that said Letters Patent is hereby corrected as shown below:

Column 3,
Line 29, insert -- truck. -- after "a"

Column 9,
Line 8, replace "tumbuckels" with -- turnbuckles --

Signed and Sealed this

Twenty-third Day of December, 2003

JAMES E. ROGAN
*Director of the United States Patent and Trademark Office*